United States Patent
Brierley

(10) Patent No.: US 6,819,224 B2
(45) Date of Patent: Nov. 16, 2004

(54) APPARATUS AND METHOD FOR DETECTING A PREDETERMINED PATTERN OF BITS IN A BITSTREAM

(75) Inventor: Paul A. Brierley, Bolton (GB)

(73) Assignee: LSI Logic Corporation, Milpitas, CA (US)

(*) Notice: Subject to any disclaimer, the term of this patent is extended or adjusted under 35 U.S.C. 154(b) by 600 days.

(21) Appl. No.: 09/862,531

(22) Filed: May 22, 2001

(65) Prior Publication Data

US 2002/0071367 A1 Jun. 13, 2002

(51) Int. Cl.[7] .............................. G06F 7/02; G05B 1/03
(52) U.S. Cl. ..................... 340/146.2; 375/368; 708/671
(58) Field of Search ..................... 340/146.2; 375/368; 708/671; 712/300

(56) References Cited

U.S. PATENT DOCUMENTS 3,927,391 A * 12/1975 Cantrell ................... 340/146.2
5,357,235 A * 10/1994 McClure ................. 340/146.2

FOREIGN PATENT DOCUMENTS

GB        2156115 A * 10/1985 ............. G06F/7/04

OTHER PUBLICATIONS

Min, J. et al., Synchronization Techniques for a Frequency–hopped wireless transceiver, Vehicular Technology Conference, 1996. 'Mobile Technology for the Human Race'., IEEE 46th, vol. 1, Iss., Apr. 28–May 1, 1996, pp.:183–187 vol. 1.*

* cited by examiner

Primary Examiner—R. Stephen Dildine
(74) Attorney, Agent, or Firm—Christopher P. Maiorana

(57) ABSTRACT

An apparatus for detecting a predetermined pattern of bits in a data bitstream includes a series of detecting elements (2–6), each detecting element in the series corresponding to a predetermined bit in the predetermined pattern. Each detecting element receives a data bit from the data bitstream (8), the corresponding predetermined bit in the predetermined pattern and an error signal from a previous detecting element in the series. The output of each detecting element is an error signal indicative of the number of mismatches between the data bit and the corresponding predetermined bit in the predetermined pattern, both in previous detecting elements in the series in previous clock cycles and in the current detecting element in the current clock cycle. The error signal of the final detecting element (6) of the series is coupled to a logic control element (18) for detecting that a maximum allowed level of mismatches has been detected.

19 Claims, 3 Drawing Sheets

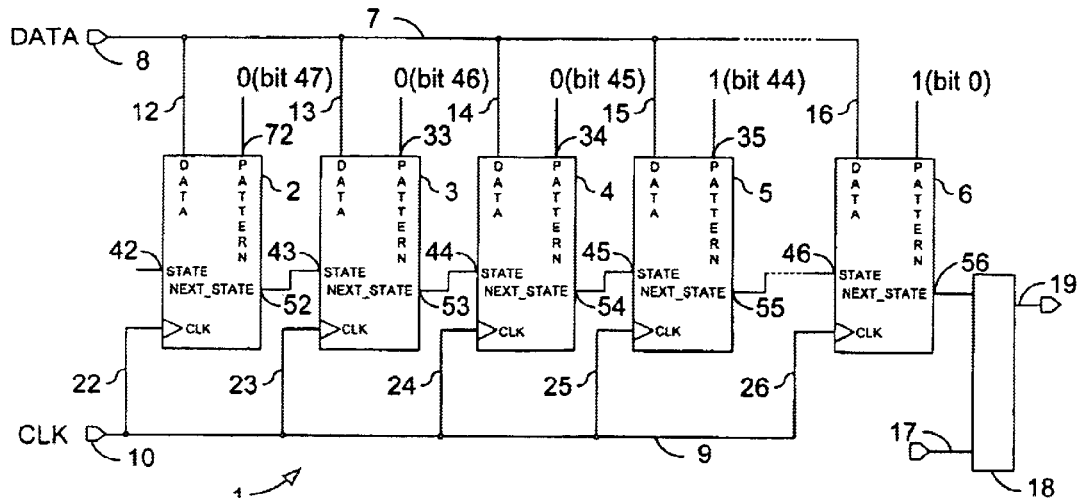
FIG. 1
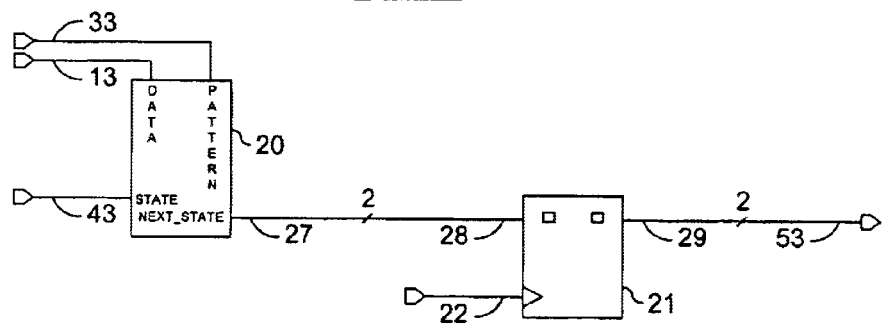
FIG. 2
| STATE (ERRORS SO FAR) | EXAMPLE OF ENCODING STATE[1:0] | NEXT STATE ERRORS SO FAR | |
|---|---|---|---|
| | | DATA=PATTERN | DATA<>PATTERN |
| A(0) | 00 | A (0) | B (1) |
| B (1) | 01 | B (1) | C (2) |
| C (2) | 11 | C (2) | D (>2) |
| D (>2) | 10 | D (>2) | D (>2) |
FIG. 3

APPARATUS AND METHOD FOR DETECTING A PREDETERMINED PATTERN OF BITS IN A BITSTREAM

This application claims the benefit of United Kingdom Application No. 0026121.4 filed Oct. 25, 2000.

FIELD OF THE INVENTION

The present invention relates to a method and/or apparatus for detecting a predetermined pattern of bits in a bitstream, particularly, though not exclusively, to a synchronization pattern in a bitstream in a magnetic or optical disc (including Digital Versatile Disc (DVD)) read channel to use as a starting point for data recovery.

BACKGROUND OF THE INVENTION

Synchronization detectors are used in magnetic and optical disc (including DVD) read channels to identify a known fixed pattern in a serial sequence of bits to use as a starting point in recovering the data. The requirement is to identify where in a random sequence of bits a particular known synchronization pattern occurs. The synchronization pattern is chosen such that it could not occur within the user data (i.e., the synchronization pattern typically contains invalid codewords which could not occur "naturally"). For example, a DVD-RAM address mark could be formed by the following synchronization pattern: (bit 47) 0001 0001 0000 0000 0000 01000100 01 00 0000 0000 0001 0001 (bit 0)

SUMMARY OF THE INVENTION

One aspect of the present invention concerns an apparatus for detecting a predetermined pattern of bits in a data bitstream. The apparatus comprises a series of detecting elements coupled in a series configuration corresponding to a predetermined bit in the predetermined pattern of bits. Each detecting element may be configured to present an output configured to indicate a number of mismatches between (i) the data bit received at the first input in a current detecting element and (ii) the corresponding predetermined bit in the predetermined pattern of bits received at the second input in previous detecting elements.

It is therefore an object of the present invention to provide a synchronization detector which can be used to identify a synchronization pattern in a data bitstream such that a defined point of the user data can be determined.

BRIEF DESCRIPTION OF THE DRAWINGS

These and other objects, features and advantages of the present invention will be apparent from the following detailed description and the appended claims and drawings in which:

FIG. 1 is a block diagram of a synchronization detector according to an embodiment of the present invention;

FIG. 2 is a schematic diagram of a detecting element of the detector of FIG. 1;

FIG. 3 is a logic table for the combinational logic element of the detecting element of FIG. 2;

DETAILED DESCRIPTION OF THE PREFERRED EMBODIMENTS

Figure 4:
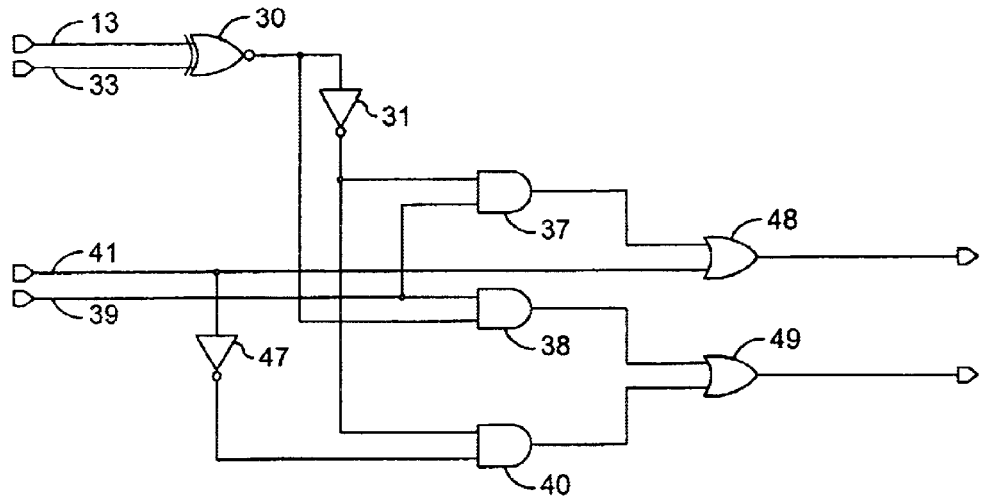
FIG. 4 is a schematic diagram of the combinational logic element of the detecting element of FIG. 2.

Accordingly, one aspect of the present invention provides an apparatus for detecting a predetermined pattern of bits in a data bitstream. The apparatus comprises a data input for receiving the data bitstream and a series of detecting elements. Each of the detecting elements generally corresponds to a predetermined bit in the predetermined pattern. Each of the detecting elements may have (i) a first input configured to receive a data bit from the data bitstream, (ii) a second input configured to receive the corresponding predetermined bit in the predetermined pattern, (iii) a third input configured to receive an error signal from a previous detecting element, (iv) a fourth input configured to receive a clock signal, and (v) an output coupled to the third input of a next detecting element in the series. The output generally provides the error signal indicative of the number of mismatches between the data bit received at the first input and the corresponding predetermined bit in the predetermined pattern received at the second input in previous detecting elements in previous clock cycles and in the current detecting element in the current clock cycle. In one example, the apparatus further comprises a logic control element having an input coupled to the output of the final detecting element. The logic control element may be configured to (i) detect whether a predetermined maximum allowed number of mismatches has been detected and (ii) generate an output indicating that the predetermined pattern of bits in the bitstream has been detected when the predetermined maximum allowed number of mismatches is detected. In one example, the logic control element includes a second input for receiving a signal indicating the predetermined maximum allowed number of mismatches.

In one example, each detecting element generally comprises a comparator having a first input coupled to the first input of the detecting element, a second input coupled to the second input of the detecting element, and an output providing a signal indicative of whether the data bit and the corresponding predetermined bit in the predetermined pattern match or are mismatched. Each detecting element may further comprise a combinational logic element having a first input coupled to the output of the comparator, a second input coupled to the third input of the detecting element, and an output providing the error signal. In one example, each detecting element may further comprise a register having a first input coupled to the output of the combinational logic element, a second input coupled to the clock input of the detecting element, and an output for providing the error signal at the first input at the next clock cycle.

In one implementation, the series of detecting elements are divided into a number of sets of detecting elements. Each set may have a predetermined number of detecting elements. The apparatus may further comprise a serial to parallel converter coupled between the input to the apparatus and the series of detecting elements. The serial to parallel converter may be configured to convert the data bitstream into sequences of bits, where each sequence generally has the same number of bits as the number of detecting elements in each set.

According to another aspect of the present invention, a method of detecting a predetermined pattern of bits in a data bitstream is provided. The method comprises the steps of (i) receiving the data bitstream, (ii) applying a data bit from the data bitstream to each detecting element in a series of detecting elements, each detecting element in the series corresponding to a predetermined bit in the predetermined pattern, (iii) applying to each detecting element in the series of detecting elements the corresponding predetermined bit in the predetermined pattern, (iv) applying an error signal from a previous detecting element in the series to each detecting element in the series of detecting elements, (v) applying a clock signal to each detecting element in the series of detecting elements, (vi) generating, in each detecting element in the series of detecting elements an error signal indicative of the number of mismatches between the received data bit and the corresponding predetermined bit in the predetermined pattern in previous detecting elements in the series in previous clock cycles and in the current detecting element in the current clock cycle, (vii) detecting that a maximum allowed level of mismatches has been detected, and (viii) providing an indication that the predetermined pattern of bits in the bitstream has been detected when the maximum allowed level of mismatches is detected.

Referring to FIG. 1, a synchronization detector 1 is shown is accordance with the present invention. The synchronization detector 1 is generally formed by a chain of detecting elements 2–6, of which only five are shown. The chain will normally have as many elements as there are bits in the data bit pattern to be found. For example, for a synchronization pattern of 48 data bits there would be 48 detecting elements. The first four elements 2–5 are shown in series, with the final element 6 being coupled to the rest via dotted lines, which are intended to indicate that there are other detecting elements present which are not shown. For a synchronization pattern of 48 data bits, there would be 43 elements that are not shown.

Each of the detecting elements 2–6 has a data input 12–16 coupled to a data input line 7 which generally receives a data bitstream from a data input terminal 8, so that each of the bits in the bitstream is applied at the same time to each data input of the detecting elements. Each of the detecting elements 2–6 also has a clock input 22–26 coupled to a clock line 9 which generally receives a clock signal from a clock terminal 10. An expected pattern bit is provided to the detecting elements at a pattern bit input 32–36. Each of the detecting elements receives the particular pattern bit corresponding to the position of the particular detecting element in the synchronization pattern, so that for a 48-bit synchronization pattern, the first bit (e.g., bit 47) is applied to the first detecting element 2, the second bit (e.g., bit 46) is applied to pattern input 33 of the second detecting element 3 and so on, with the final bit (e.g., bit 0) being applied to the pattern input 36 of the final detecting element 6. The synchronization pattern may be predetermined for any particular application. The synchronization pattern can be stored or pre-programmed in any desired manner to provide the appropriate bits at the pattern inputs to the detecting elements.

Each detecting element also has an error input 43–46 which is coupled to an error output 52–55 of the previous detecting element in the chain. Each detecting element provides an error signal at its error output 52–56 indicating how many errors have been found so far by taking an error signal received from the previous detecting element in the chain and adding to the error signal any error that may be found between the data bit at the data input and the pattern bit at the pattern input to the particular detecting element. The addition then forms the error signal that is passed on to the next detecting element in the chain. The error signal may be implemented, in a preferred example, as a 2-bit signal indicating whether the total number of errors is zero, one, two or more than two.

The first detecting element 2 in the chain has an error input 42 that is not connected to an output of a previous detecting element and so it receives an initialization value which is a value indicating a previous error count of zero. The error output 56 of the final detecting element 6 in the chain is coupled to an error input of a logic control element 18. The logic control element 18 also has an error tolerance input 17 which receives a signal indicating what level of error in the data can be tolerated and still consider that the correct synchronization pattern has been detected. For example, if the error tolerance is set to zero, then the logic control element 18 will require an error signal indicating zero errors at the error output 56 of the final detecting element 6 in order to produce a signal at its output 19 indicating that the synchronization pattern has been found. If the error tolerance signal indicates that one or two errors can be tolerated, then the logic control element 18 will produce the signal indicating that the synchronization pattern has been found when any number of errors except more than two are indicated by the error signal at the output 56 of the detecting element 6.

If the error signal has more than two bits, then a greater discrimination of error tolerance can be made. However, to illustrate the case with a 2-bit line, FIG. 2 shows a single detecting element (e.g., detecting element 3 of FIG. 1). The detecting element 3 includes an error combinational logic element 20 and a flip-flop latch 21. The error combinational logic element 20 has the data input 13, the pattern input 33 and the error input 43. The error combinational logic element 20 compares the signals at the data and pattern inputs 13 and 33 and adds the result to the error signal at the error input 43 to provide an error signal at its output 27, which is coupled to a D input 28 of the latch 21. The clock input 23 is provided to the latch 21 to clock the error signal to a Q output 29 providing the error output 53 at the next clock cycle.

An implementation of the error combinational logic element 20 is shown in FIG. 4, where the data and pattern inputs 13 and 33 are provided as the input to a gate 30 (e.g.,an inverted exclusive OR) which provides a positive output when the two inputs match and provides a false output when the two inputs do not match. The output of the inverted exclusive OR gate 30 is coupled (i) via an inverter 31 to a first input of a gate 37 (e.g., an AND gate), and (ii) directly to a second input of a gate 38 (e.g., an AND gate). The other input of each of the AND gates 37 and 38 are coupled to receive a first bit (e.g., 39) of the error signal at an error input. The output of inverter 31 is also coupled to a first input of a gate 40 (e.g., an AND gate). A second input of the AND gate 40 is coupled to receive the second bit (e.g., 41) of the error signal at the error input via an inverter 47. The outputs of the AND gates 38 and 40 are coupled to a gate 49 (e.g., inclusive OR gate), whose output provides the first bit of the error signal at the output 27 of the error combinational logic element 20. The output of the AND gate 37 is coupled to a first input of a gate 48 (e.g., an inclusive OR gate), whose second input is coupled to receive the second bit (e.g., 41) of the error signal at error input. The error combinational logic element 20 provides a 2-bit output signal providing an indication of the number of mismatches, or errors, so far, based on a 2-bit error signal from the previous error combinational logic element and on whether there is a mismatch in the bits at the data and pattern inputs. Other bit-widths may be implemented to meet the design criteria of a particular implementation. The 2-bit signals indicating the number of errors in the previous element and this element are shown in FIG. 3 for zero, one, two and more than two errors. Taking one example, if the error signal indicates state B (one error so far) at the error input, and if the data and pattern inputs 13 and 33 match, then:

input 13=1 input 33=1 input 41=0 input 39=1 output of inverted exclusive OR gate 30=1 output of inverter 31=0 output of inverter 47=1 output of AND gate 37=0 output of AND gate 38=1 output of AND gate 40=0 output of inclusive OR gate 48=0 output of inclusive OR gate 49=1 so that the next error signal also indicates state B (one error so far) at the error output 27.

Similarly, if the error signal indicates state B (one error so far) at the error input 43, and if the data and pattern inputs 13 and 33 do not match, then:

input 13=1 input 33=0 input 41=0 input 39=1 output of inverted exclusive OR gate 30=0 output of inverter 31=1 output of inverter 47=1 output of AND gate 37=1 output of AND gate 38=0 output of AND gate 40=1 output of inclusive OR gate 48=1 output of inclusive OR gate 49=1 so that the next error signal also indicates state C (two errors so far) at the error output 27, as required. The other states can be seen in the table of FIG. 3.

Thus, returning to FIG. 1, and taking an example of a 5-bit synchronization pattern of 10000 with a chain of five detecting elements, the error states at the error outputs after each clock cycle as the bitstream starts upon the correct synchronization pattern will be:

| Clock Cycle = | x | x + 1 | x + 2 | x + 3 | x + 4 |
| --- | --- | --- | --- | --- | --- |
| Data Bit = | 1 | 0 | 0 | 0 | 0 |
| output 52 = | A | B | B | B | B |
| output 53 = | B–C | A | B | B | B |
| output 54 = | B–D | B–C | A | B | B |
| output 55 = | B–D | B–D | B–C | A | B |
| output 56 = | B–D | B–D | B–D | B–C | A |

The initialization value at the error input of the first detecting element is set to state A (zero errors), whereas the error inputs of the other detecting elements will be random (based on the "random" bits in the bitstream before the synchronization pattern appears, so that the error outputs of those detecting elements when the first data bit of the synchronization pattern appears will be B or higher (since the first data bit and the pattern bits are mismatched for all the detecting elements except for the first in this example).

When the appropriate error state, as determined at error tolerance input 17, is detected at error output 56 of the final detecting element 6 in the chain by the logic control element 18, then the logic control element 18 will produce a signal at its output 19 indicating that the synchronization pattern has been found.

Thus, a new input sequence is checked on every clock cycle. The data input is applied to all the detecting elements at once. At any given, time the synchronization detector is checking 48 (in the example given) sequences of bits simultaneously each shifted by one clock cycle. The search pattern (e.g., the pattern inputs to the detecting elements) is effectively fixed, with each element checking a particular bit of the pattern (e.g., the left-most detecting element checks for the first bit being 0 in all input sequences and advances the error count by 1 whenever its input is a 1). Each detecting element in the array is a modified shift register which shifts, instead of the data, the number of errors-so-far for the input sequence. If a perfect synchronization pattern is received, an 'errors-so-far' score of 0 (state A) will eventually be passed all the way to the last element and decoded to produce a pulse indicating that a valid synchronization pattern has occurred over the last 48 clock cycles. If an error tolerance of 1 is selected, the output decode logic will produce a 1 (synchronization found) whenever the code for state A or state B reaches the output stage, etc.

The synchronization detector may be modified to allow particular bits in the synchronization pattern to be "don't care" by modifying the next state logic for a particular bit position to encode that bit to be always "correct". The flip-flop latches inside the next state blocks are preset to power-up in the >2 errors condition (state D) such that the system does not have any false memory of a partially correct sequence on start-up.

Figure 5:
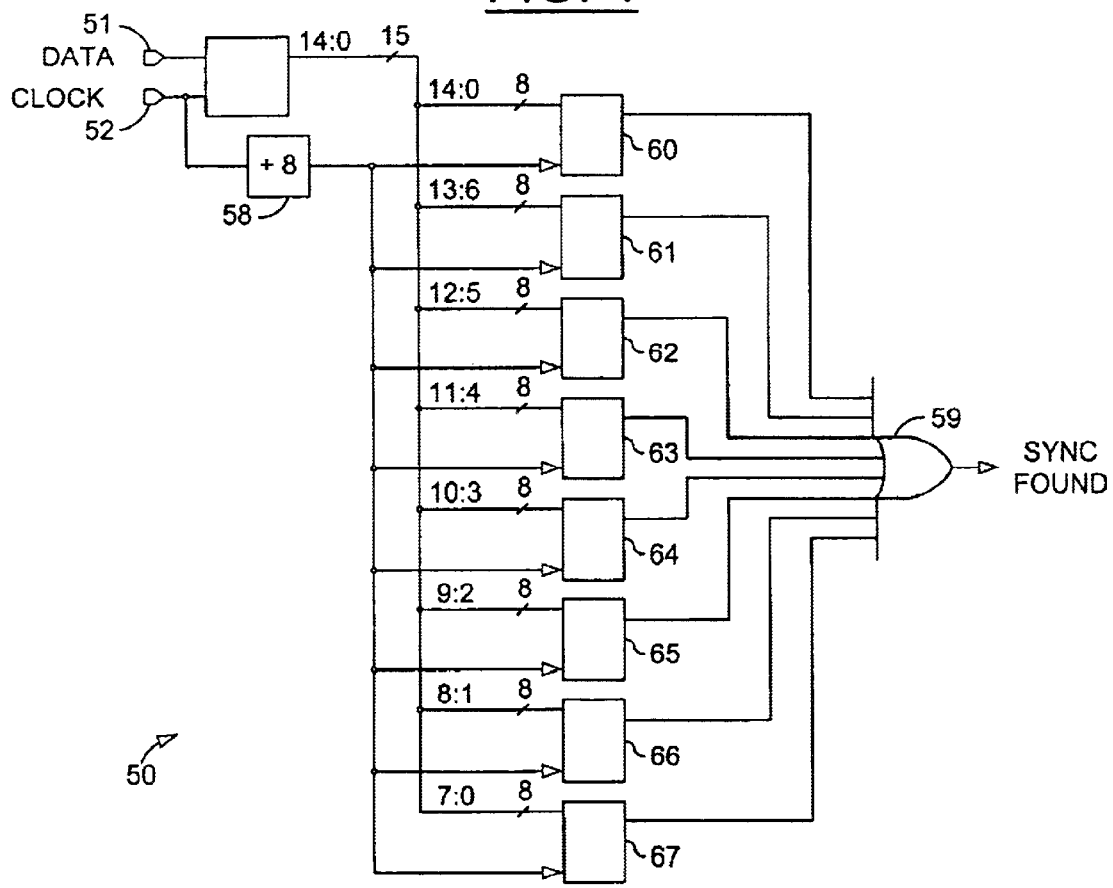
FIG. 5 is a schematic diagram of a synchronization detector according to another embodiment of the present invention.

Turning now to FIG. 5, a second embodiment of a synchronization detector 50 is shown. The detector 50 may detect a 48-bit DVD-ROM address mark synchronization pattern in a DVD-ROM reader system. In this case, the architecture of FIG. 1 is enhanced for high-speed performance to achieve 16× (or greater) DVD performance by performing the synchronization detection in 8-bit parallel blocks. The original input serial bitstream at input terminal 51 is first converted into 15-bit words captured from the last 15 bits of the serial bitstream. The conversion generally occurs every eight clock cycles and may be implemented by a serial to parallel converter 57. The serial to parallel converter 57 also receives the serial clock provided at clock input 52.

Because the byte alignment of the synchronization pattern in the original serial data is initially unknown, eight similar parallel synchronization detectors 60–67 are employed, each checking for the same defined pattern of 6-bytes. The data inputs to the eight parallel synchronization detectors 60–67 are supplied from different taps from the serial-to-parallel converter 57. The input to each of the synchronization detectors 60–67 has the byte boundary shifted by 1 bit. The first synchronization detector 60 receives bits 14 to 7, the second synchronization detector 61 receives bits 13 to 6, and so on. The serial clock input 52 is also coupled to a divider 58 where it is divided by eight. This divided clock signal is then presented to the clock inputs of each of the eight parallel synchronization detectors 60–67. Each of the parallel synchronization detectors 60–67 has an output providing a signal indicative of whether the correct synchronization pattern has been found. The outputs of all eight synchronization detectors 60–67 are coupled to a gate 59 (e.g., an OR gate) which provides a synchronization found signal when one of the eight parallel synchronization detectors 60–67 locates the synchronization pattern.

The synchronization detector system 50 may be used to correctly frame the original serial data into 8-bit words starting with the bit which immediately follows the desired synchronization pattern. When the synchronization pattern is found by one of the parallel detectors, only the input bytes for this particular block will have the correct byte framing. The output pulse from the OR gate 59 is used to enable a register which stores the position of the detector which found the synchronization pattern. This information is used to select the corresponding input to that synchronization detector as the correctly framed output of the data port.

Figure 6:
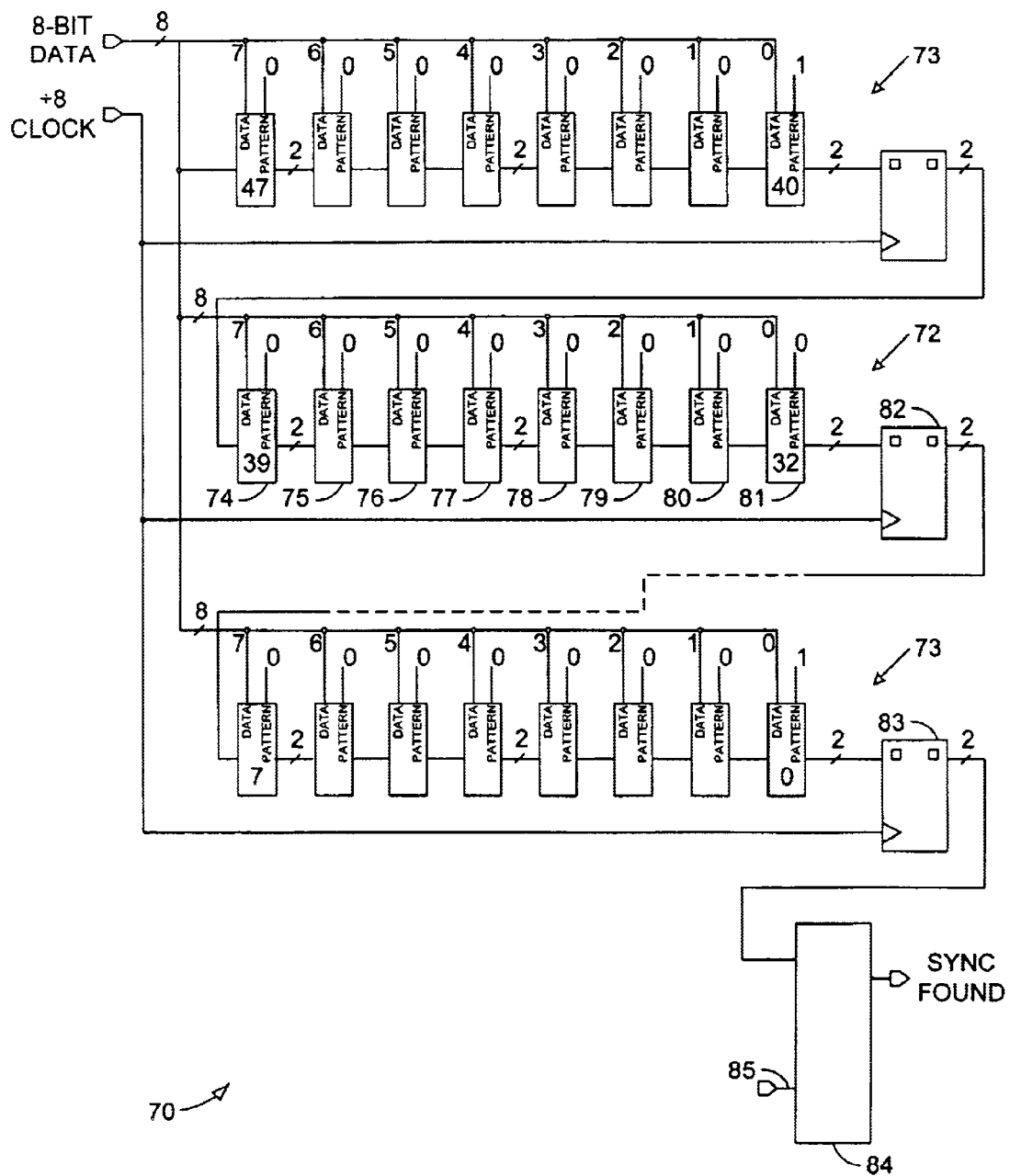
FIG. 6 is a schematic diagram of one parallel synchronization detecting element of the detector of FIG. 5.

FIG. 6 shows one (e.g., 70) of the parallel synchronization detectors 60–67. The 48 detector elements, which were coupled in series in the above embodiment described with reference to FIGS. 1 to 4, are now re-organized as six blocks, each having eight cascaded error combinational logic elements. This arrangement is similar to the previously described error combinational logic element 20 of FIG. 2. FIG. 6 shows three such blocks 71, 72 and 73, with the dotted lines between the second and third blocks indicating that there are further blocks between them. As shown, each block, for example block 72, is formed by eight cascaded error combinational logic elements 74–81 and one latch 82 (e.g., D-type flip-flop latch). Each of the eight error combinational logic elements has a data input which receives one bit of the 8-bit word input to the synchronization detector. Thus, each of the elements receives a different data bit. Similarly, each of the elements receives a different pattern bit. The elements operate similarly to the element of FIG. 2 and their operation will not be described again here, except that the error output of the final element of each block is passed to the latch 82, similarly to the operation of latch 21 of FIG. 2. However, the output of the latch 82 is provided as the error signal to the error input of the first element of the next block, except for the final block 73, the output of whose latch 83 is provided to an error input of a logic control element 84. The logic control element 84 also has an error tolerance input 85 which receives a signal indicating what level of error in the data can be tolerated and still consider that the correct synchronization pattern has been detected, as described with reference to the embodiment of FIG. 1.

The speed improvement arises from the fact that, although the combinational delay through a cascaded row is increased 8-fold, only a single register setup time is needed, which represents a much lower proportion of the divided-by-8 clock period. The serial synchronization detector checks for the correct sequence of 48 bits over 48 cycles of the data-rate clock, whereas the parallel synchronization detector checks for a correct sequence of six 8-bit words over 6 cycles (of the data-rate clock divided by 8).

Although only two particular embodiments of the invention have been described in detail, various modifications and improvements can be made by a person skilled in the art without departing from the scope of the present invention. It will furthermore be appreciated that the above described method could be implemented as computer code running on an appropriate computer processor system.

What is claimed is:

1. Apparatus for detecting a predetermined pattern of bits in a data bitstream, the apparatus comprising:

a number of detecting elements coupled in a series configuration corresponding to a predetermined bit in the predetermined pattern of bits, each detecting element configured to present an output configured to indicate a number of mismatches between (i) the data bit received at the first input in a current detecting element and (ii) the corresponding predetermined bit in the predetermined pattern of bits received at the second input in previous detecting elements.

2. The apparatus according to claim 1, wherein each of the detecting elements comprises:

a data input configured to receive the data bitstream, a first input configured to receive a data bit from the data bitstream, a second input configured to receive the corresponding predetermined bit in the predetermined pattern of bits, a third input configured to receive an error signal from a previous detecting element in the series, and a fourth input configured to receive a clock signal; and an output coupled to the third input of a next detecting element in the series, configured to generate said output.

3. The apparatus according to claim 1, wherein the output is further indicative of the current detecting element in the current clock cycle and the previous detecting elements in previous clock cycles.

4. The apparatus according to claim 1, further comprising:

a logic control element coupled to the output of the final detecting element of the series and configured to detect if a predetermined maximum allowed number of mismatches is detected.

5. The apparatus according to claim 4, wherein said logic control element is further configured to provide a logical output configured to indicate if the predetermined pattern of bits in the bitstream is detected when the predetermined maximum allowed number of mismatches is detected.

6. The apparatus according to claim 5, wherein the logic control element further comprises a second input configured to receive a signal indicating the predetermined maximum allowed number of mismatches.

7. The apparatus according to claim 1, wherein each detecting element comprises:

a comparator having a first input coupled to the first input of the detecting element, a second input coupled to the second input of the detecting element, and an output providing a signal indicative of whether the data bit and the corresponding predetermined bit in the predetermined pattern of bits matched or mismatched.

8. The apparatus according to claim 7, wherein each detecting element further comprises:

a combinational logic element having a first input coupled to the output of the comparator, a second input coupled to the third input of the detecting element, and an output configured to provide the output.

9. The apparatus according to claim 8, wherein each detecting element further comprises:

a register having a first input coupled to the output of the combinational logic element, a second input couple to the clock input of the detecting element, and an output configured to provide the output at the first input at the next clock cycle.

10. The apparatus according to claim 1, wherein the series of detecting elements is divided into a number of sets of detecting elements, each set having a predetermined number of detecting elements, the apparatus further comprising a serial to parallel converter coupled between the input to the apparatus and the series of detecting elements to convert the data bitstream into sequences of bits, each sequence having the same number of bits as the number of detecting elements in each set.

11. The apparatus according to claim 1, wherein the each outputs of said detect elements comprises an error signal.

12. An apparatus configured to detect a predetermined pattern of bits in a data bitstream, comprising:

means for applying a data bit from the data bitstream to each detecting element in a series of detecting elements, each detecting element in the series corresponding to a predetermined bit in the predetermined pattern;

means for applying to each detecting element in the series of detecting elements the corresponding predetermined bit in the predetermined pattern of bits; and means for generating, in each detecting element in the series of detecting elements an error signal indicative of the number of mismatches between the received data bit and the corresponding predetermined bit in the predetermined pattern in previous detecting elements in the series in previous clock cycles and in the current detecting element in the current clock cycle.

13. A method of detecting a predetermined pattern of bits in a data bitstream, the method comprising the steps of:

(A) applying a data bit from the data bitstream to each detecting element in a series of detecting elements, each detecting element in the series corresponding to a predetermined bit in the predetermined pattern;

(B) applying to each detecting element in the series of detecting elements the corresponding predetermined bit in the predetermined pattern of bits; and (C) generating in each detecting element in the series of detecting elements an error signal indicative of the number of mismatches between the received data bit and the corresponding predetermined bit in the predetermined pattern in previous detecting elements in the series in previous clock cycles and in the current detecting element in the current clock cycle.

14. The method according to claim 13, further comprising the step of:

receiving the data bitstream.

15. The method according to claim 13, further comprising the step of:

applying an error signal from a previous detecting element in the series to each detecting element in the series of detecting elements.

16. The method according to claim 13, further comprising the step of:

detecting that a predetermined maximum allowed number of mismatches has been detected.

17. The method according to claim 13, further comprising the step of:

providing an indication that the predetermined pattern of bits in the bitstream has been detected when the predetermined maximum allowed number of mismatches is detected.

18. The method according to claim 13, further comprising the step of:

receiving a signal indicating the predetermined maximum allowed number of mismatches.

19. A computer readable medium configured to store and execute the steps of claim 13.

* * * * *